United States Patent
Pawar et al.

(10) Patent No.: US 11,795,917 B2
(45) Date of Patent: Oct. 24, 2023

(54) EDGE PRESSURE RELIEVING GROOVE SHAFT

(71) Applicant: General Electric Renovables Espana, S.L., Barcelona (ES)

(72) Inventors: Hemant Bhimrao Pawar, Bengaluru (IN); Bradley Graham Moore, Greenville, SC (US); Vinay Bawane, Bengaluru (IN); Christopher Michael Bean, Fountain Inn, SC (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/702,047

(22) Filed: Mar. 23, 2022

(65) Prior Publication Data
US 2023/0304474 A1 Sep. 28, 2023

(51) Int. Cl.
*F03D 15/00* (2016.01)
*F03D 80/80* (2016.01)

(52) U.S. Cl.
CPC ............. *F03D 15/00* (2016.05); *F03D 80/88* (2016.05); *F05B 2230/60* (2013.01); *F05B 2240/60* (2013.01)

(58) Field of Classification Search
CPC ...... F03D 15/00; F03D 80/88; F05B 2230/60; F05B 2240/60
See application file for complete search history.

(56) References Cited

U.S. PATENT DOCUMENTS

| 8,907,517 | B2 | 12/2014 | Mongeau et al. |
| 9,145,870 | B2* | 9/2015 | Redin Miqueleiz .... F03D 15/00 |
| 9,206,743 | B2 | 12/2015 | Schnetgoke |
| 9,249,782 | B2 | 2/2016 | Minadeo et al. |
| 9,856,966 | B2 | 1/2018 | Wilson |
| 10,054,109 | B2 | 8/2018 | Bitsch |
| 11,236,730 | B2 | 2/2022 | Rogg |
| 2010/0143527 | A1* | 6/2010 | Mathai ................. B21C 23/183 29/598 |
| 2016/0108895 | A1* | 4/2016 | Holloway ............... F03D 15/00 416/223 R |
| 2017/0175717 | A1 | 6/2017 | Saenz De Ugarte Sevilla et al. |

(Continued)

FOREIGN PATENT DOCUMENTS

| CN | 201385097 Y | 1/2010 |
| CN | 201385098 Y | 1/2010 |

(Continued)

OTHER PUBLICATIONS

EP Search Report for EP application No. 23161243.2, dated Aug. 23, 2023, 7 pages.

*Primary Examiner* — Aaron R Eastman
(74) *Attorney, Agent, or Firm* — Dority & Manning, P.A.

(57) ABSTRACT

A main rotor shaft of a wind turbine configured to reducing contact pressure at a hub joint connection includes a flanged portion and a rod portion. The flanged portion includes an outer circumferential edge, an outer radial area, and an inner radial area. The outer radial area includes holes placed around the outer radial area for attachment to a wind turbine hub. The outer circumferential edge includes a groove placed atop the outer circumferential edge. The rod portion is formed with the inner radial area and configured for connection to a gearbox of a wind turbine.

20 Claims, 7 Drawing Sheets

(56) References Cited

U.S. PATENT DOCUMENTS

2021/0178534 A1 6/2021 Bosukonda et al.
2021/0215184 A1 7/2021 Moore et al.

FOREIGN PATENT DOCUMENTS

| CN | 109667725 A | 4/2019 |
|----|-------------|--------|
| CN | 108843520 B | 3/2020 |
| CN | 111852787 A | 10/2020 |
| CN | 110630743 B | 6/2021 |
| CN | 111075663 B | 7/2021 |
| EP | 2202013 B1  | 8/2011 |
| EP | 2882962 B1  | 10/2016 |
| EP | 3168463 B1  | 5/2019 |

\* cited by examiner

EDGE PRESSURE RELIEVING GROOVE SHAFT

FIELD

The present disclosure relates generally to wind turbines, and more particularly, to shafts of wind turbines with improved flanged portions configured to reducing hub-shaft joint edge contact pressure and hub fretting fatigue.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, a rotatable hub having one or more rotor blades mounted thereto, and a main rotor shaft which connects the rotatable hub to the gearbox. The rotor blades are typically mounted to the hub via respective pitch bearings that allow rotation of each of the rotor blades about a pitch axis. Thus, the rotor blades capture kinetic energy of wind using known airfoil principles. For example, the rotor blades typically have the cross-sectional profile of an airfoil such that, during operation, air flows over the rotor blades producing a pressure difference between the sides. Consequently, a lift force, which is directed from a pressure side towards a suction side, acts on the each of the rotor blades. The lift force generates torque on the main rotor shaft, which is typically geared to a generator for producing electricity.

However, when torque is generated on the main rotor shaft micromovements occur at the joint connection point between the main rotor shaft and the hub. These micromovements can be harmless at certain levels of pressure, but when a significant enough pressure is created at the hub-shaft joint connection, fatigue on the hub may occur. If left alone, this fatigue can create cracks on the hub. These cracks can then lead to catastrophic damage on the wind turbine which requires maintenance of the effected parts or the entire decommissioning of the wind turbine.

Thus, the industry is continuously seeking new and improved systems and methods for shafts which are configured to or capable of reducing contact pressure at the hub-shaft joint connection. Accordingly, the present disclosure is directed to a main rotor shaft configured to or capable of reducing contact pressure at the hub-shaft joint connection such that cracks are not formed and less maintenance is required for the hub or hub-shaft joint connection.

BRIEF DESCRIPTION

Aspects and advantages of the disclosure will be set forth in part in the following description, or may be obvious from the description, or may be learned through practice of the disclosure.

In one aspect, the present disclosure is directed to a main rotor shaft of a wind turbine configured to or capable of reducing contact pressure at the hub-joint connection. The main rotor shaft includes a flanged portion including an outer circumferential edge, an outer radial area, and an inner radial area, wherein the outer radial area includes holes placed around the outer radial area for attachment to a wind turbine hub, wherein the outer circumferential edge includes a groove placed atop the outer circumferential edge; and a rod portion formed with the inner radial area and configured for connection to a gearbox of the wind turbine.

In an embodiment, the groove of the outer circumferential edge defines a curved shape.

In another embodiment, the curved shape includes at least one of a half-circle, a half-ellipse, a half-oval, a half-oblong, or a trough shape.

In still another embodiment, the groove of the outer circumferential edge has a depth ranging from about 0.1 centimeters to about 200 centimeters.

In yet another embodiment, the groove atop the outer circumferential edge has a width ranging from about 0.1 centimeters to about 200 centimeters.

In a further embodiment, the groove of the outer circumferential edge is placed around about 1% to about 100% of the circumference of the outer circumferential edge.

In another embodiment, the groove of the outer circumferential edge may be continuously or discretely placed around the outer circumferential edge.

In still a further embodiment, the outer radial area has a radius ranging from about 0.5 meters to about 10 meters.

In another aspect, the present disclosure is directed to a method for manufacturing a main rotor shaft of a wind turbine configured to or capable of reducing contact pressure at the hub-joint connection. The method includes preparing a main rotor shaft, the main rotor shaft including a flanged portion with an outer circumferential edge, an outer radial area, and an inner radial area, wherein the outer radial area includes holes placed around the outer radial area for attachment to a wind turbine hub, and a rod portion formed with the inner circumferential area configured for connection to a gearbox of the wind turbine, and placing a groove atop the outer circumferential edge of the main rotor shaft.

In yet another aspect, the present disclosure is directed to a wind turbine including a main rotor shaft configured to or capable of reducing contact pressure at the hub joint connection. A wind turbine including a main rotor shaft, the wind turbine including a nacelle; a hub; and the main rotor shaft, wherein the main rotor shaft includes a flanged portion with an outer circumferential edge, an outer radial area, and an inner radial areas, wherein the outer radial area includes holes placed around the outer radial area for attachment to the hub, wherein the outer circumferential edge includes a groove placed atop the outer circumferential edge, and a rod portion formed with the inner radial area configured for connection to a gearbox within the nacelle.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
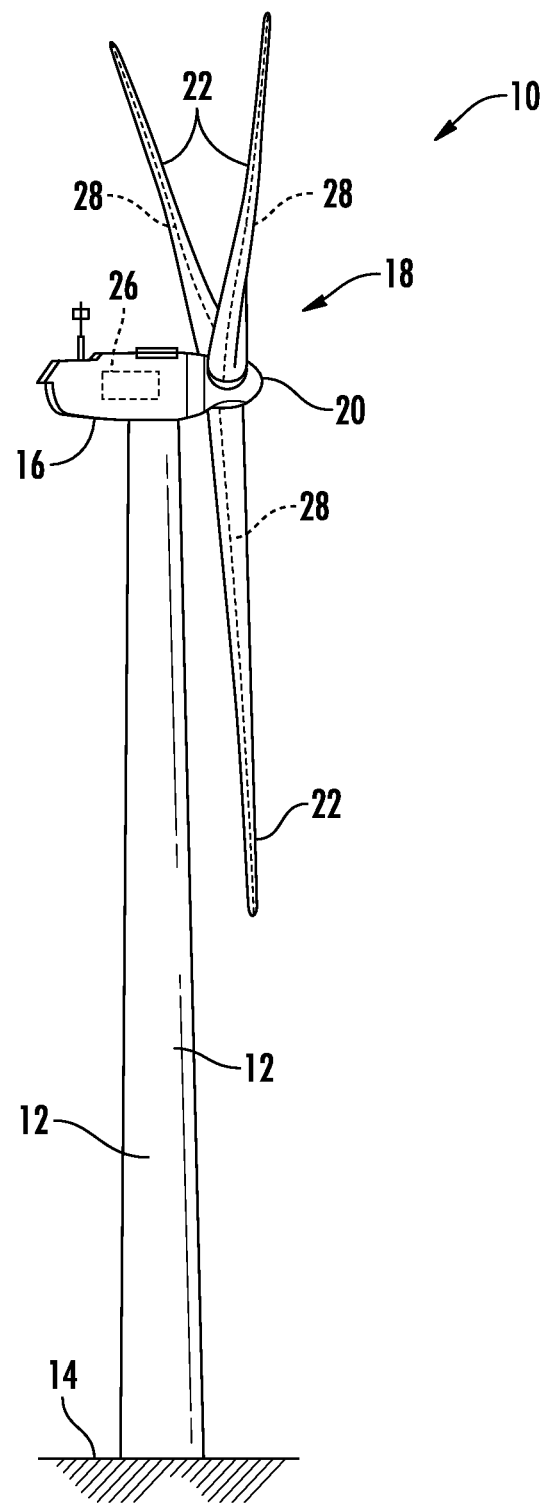
FIG. 1 illustrates a side, perspective view of an embodiment of a wind turbine in which the main rotor shaft may be used according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," "connected" and the like refer to both direct coupling, fixing, attaching, or connecting as well as indirect coupling, fixing, attaching, or connecting through one or more intermediate components or features, unless otherwise specified herein.

The terms "about" or "approximately" and the like are used herein as encompassing machining or measurement error involved with the field of endeavor where the machining or measurement error can be 10% or less, such as 7.5% or less, such as 5% or less.

In general, the present disclosure is directed to a main rotor shaft of a wind turbine configured to or capable of reducing contact pressure at the hub joint connection. In particular, the main rotor shaft may include a flanged portion including an outer circumferential edge, an outer radial area, and an inner radial area. The outer radial area may include holes placed around the outer radial area for attachment to a wind turbine hub. The outer circumferential edge may include a groove placed atop the outer circumferential edge. The main rotor shaft may also include a rod portion formed with the inner radial area and configured for connection to a gearbox of a wind turbine.

In addition, the present disclosure provides various advantages when addressing the challenges presented by micromovements occurring at the joint connection between the main rotor shaft and the hub as a result of the main rotor shaft applying pressure to the hub which are capable of causing fatigue on the hub that results in cracks forming on the hub. For example, an advantage of the present disclosure is a reduction of the contact pressure at the hub-shaft joint connection. Another advantage resulting from the reduction of contact pressure at the hub-shaft joint connection is that less fatigue and therefore less cracking may occur on the hub or hub-shaft joint connection. Still another advantage resulting from less cracking on the hub-shaft joint connection is less maintenance may be required for the hub or hub-shaft joint connection and the windmill in general.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
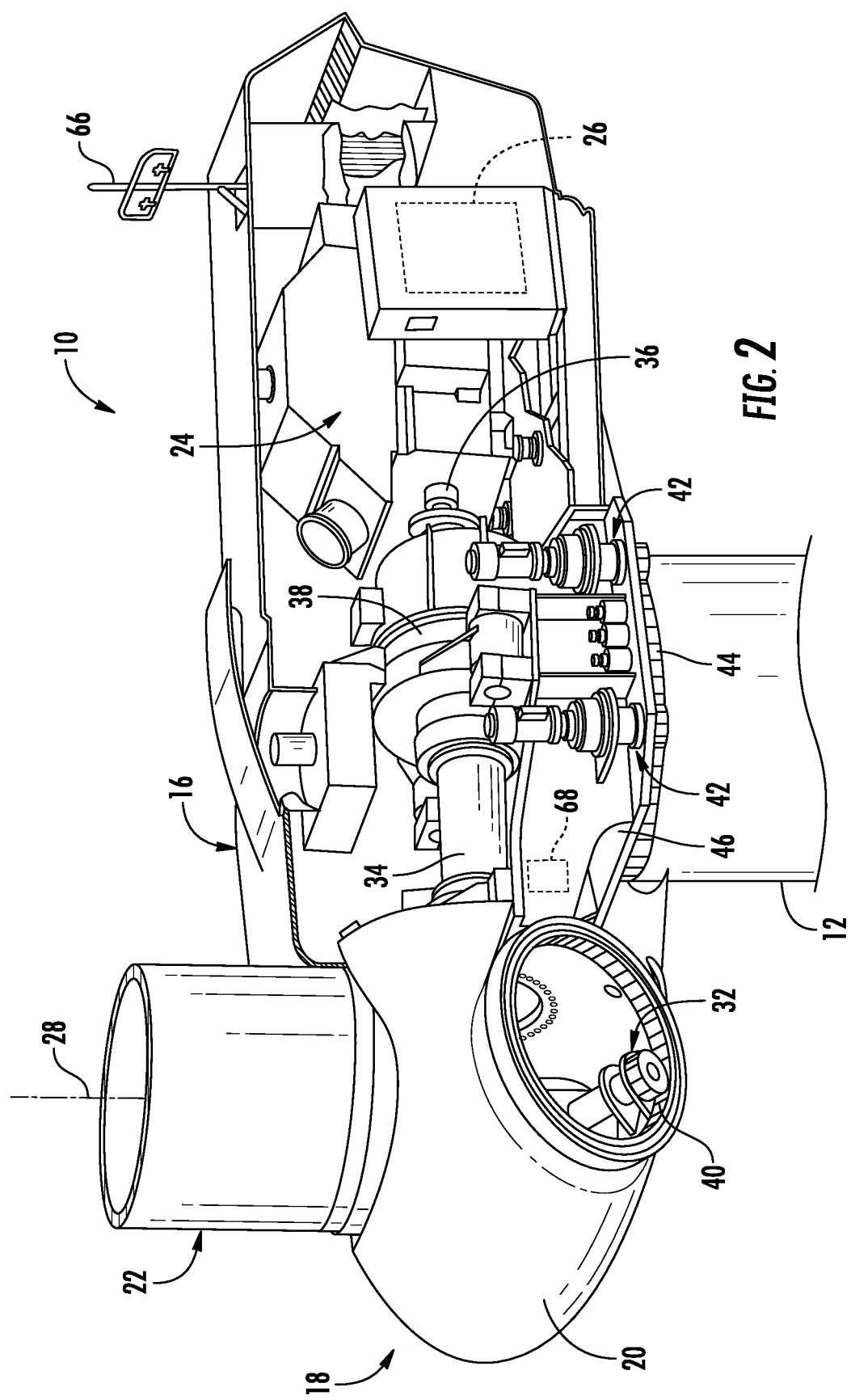
FIG. 2 illustrates an internal, perspective view of an embodiment of the nacelle of the wind turbine of FIG. 1, particularly showing the main rotor shaft according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a main rotor shaft 34 coupled to the hub 20 for rotation therewith. The main rotor shaft 34 may, in turn, be rotatably coupled to a generator shaft 36 of the generator 24 through a gearbox 38. As is generally understood, the main rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
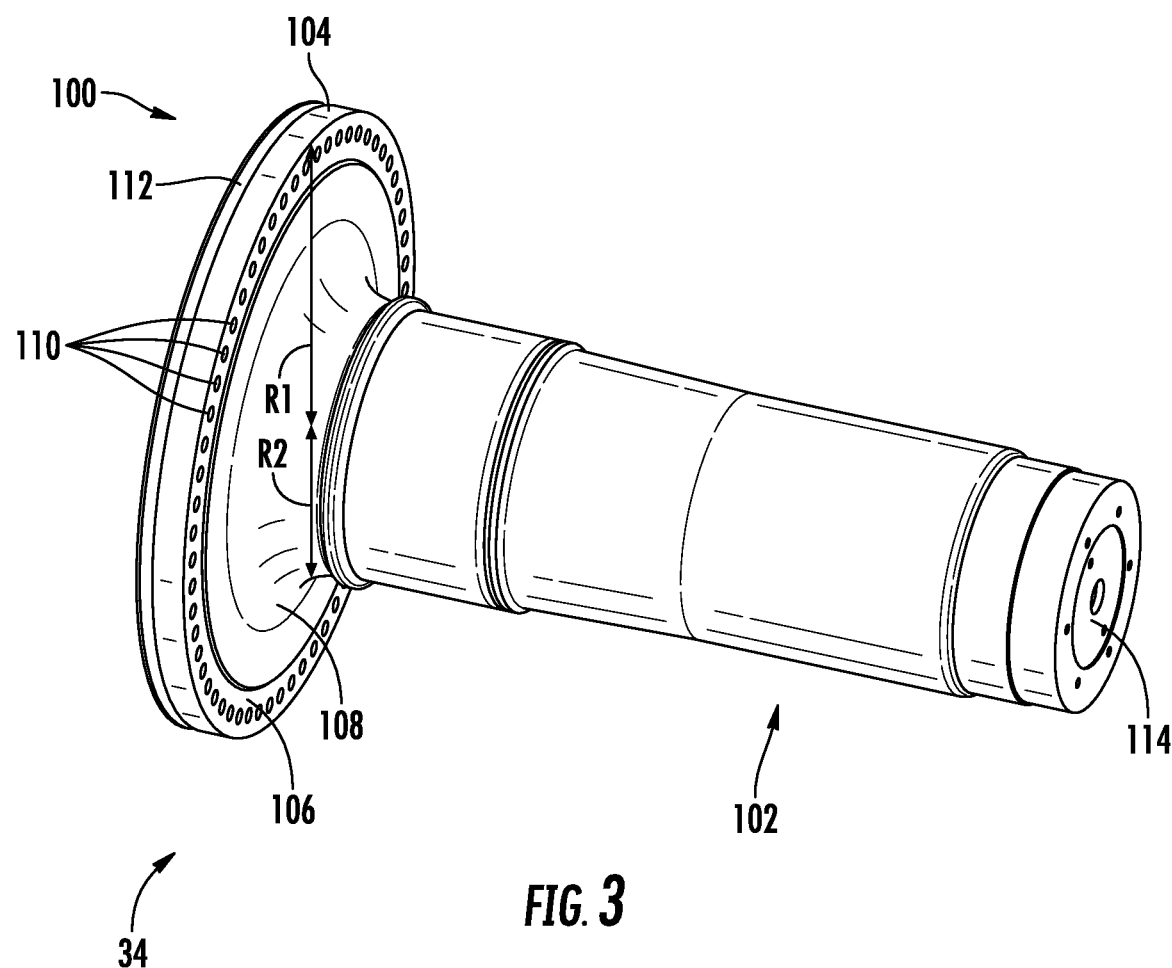
FIG. 3 illustrates an orthogonal, perspective view of an embodiment of a main rotor shaft according to the present disclosure.
Figure 4:
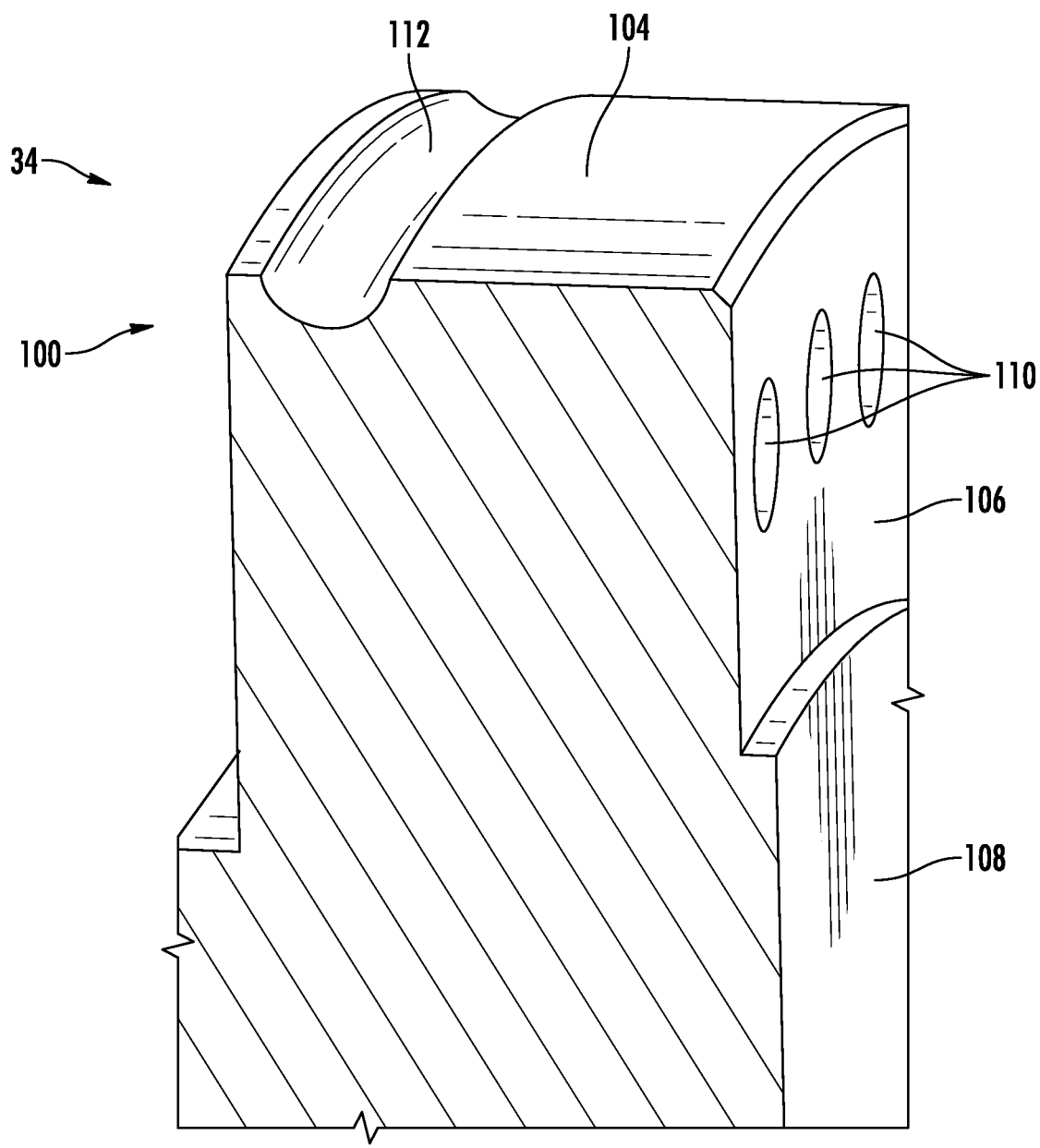
FIG. 4 illustrates a magnified, perspective view of an embodiment of main rotor shaft of FIG. 3 according to the present disclosure.

Referring now to FIGS. 3-4, various views of an embodiment of a main rotor shaft according to the present disclosure are provided. As shown, the main rotor shaft 34 may have a flanged portion 100 and a rod portion 102. The flanged portion 100 may have an outer circumferential edge 104, an outer radial area 106, and an inner radial area 108. The outer radial area 106 may include holes 110 placed around the outer radial area 106 for attachment to the hub 20 of the wind turbine 10 (see FIGS. 1-2). The outer circumferential edge 104 may have a groove 112 placed atop the outer circumferential edge 104. The rod portion 102 may be formed with the inner radial area 108 and configured for connection to the gearbox 38 (see FIG. 2).

The groove 112 of the outer circumferential edge 104 may define a curved shape. For example, the curved shape may include at least one of a half-circle, a half-ellipse, a half-oval, a half-oblong, or a trough shape. By having a variety of allowable shapes for the curved shape, manufacturing techniques used to manufacture the main rotor shaft 34 may have greater variation.

Further, the groove 112 of the outer circumferential edge 104 may have a predetermined depth D1. For example, the predetermined depth D1 may range from about 0.1 centimeters to about 200 centimeters, such as about 0.2 centimeters to about 100 centimeters, such as about 0.3 centimeters to about 50 centimeters. By having the groove 112 have a predetermined depth D1 of a sufficient size, the pressure applied at the hub-shaft connection joint may be dispersed or spread out further. By having the pressure applied at the hub-shaft joint connection dispersed or spread out further, the maximum possible pressure applied at the hub-shaft joint connection may be reduced further.

Furthermore, the groove 112 of the outer circumferential edge 104 may have a predetermined width W1. For example, the predetermined width W1 may range from about 0.1 centimeters to about 200 centimeters, such as about 0.2 centimeters to about 100 centimeters, such as about 0.3 centimeters to about 50 centimeters. Like the predetermined depth D1, by having the groove 112 have a predetermined width W1 of a sufficient size, the pressure applied at the hub-shaft connection joint may be dispersed or spread out further. By having the pressure applied at the hub-shaft joint connection dispersed or spread out further, the maximum possible pressure applied at the hub-shaft joint connection may be reduced further.

In addition, the groove 112 does not necessarily have to be placed around the entire circumference of the outer circumferential edge 104 for the groove 112 to achieve a reduction in contact pressure at the hub-shaft joint connection. For example, the groove may be placed around about 1% to about 100% of the circumference of the outer circumferential edge 104, such as about 10% to about 80%, such as about 25 to about 75%, such as about 40% to about 60%. Moreover, the groove 112 may still be configured to or capable of achieving a reduction in contact pressure at the hub-shaft joint connection if the groove is placed discontinuously atop the outer circumferential edge 104.

In addition, the groove 112 may be placed continuously or discretely around the outer circumferential edge 104. For example, if the groove 112 is to be placed discretely, the placement of the groove 112 may be interrupted by unmodified portions on the windmill turbine. For example, if the groove 112 is to be placed continuously, the groove 112 may also be placed without any unmodified portions on the windmill turbine. Further, the groove 112 may also only placed around 1 to about 100% of the circumference of the outer circumferential edge 104 while also being placed continuously or discretely. For example, the groove 112 may be continuously placed on only about 1 to about 100% of the outer circumferential edge 104. Alternatively, the groove 112 may be discretely placed on only about 1 to about 100% of the outer circumferential edge 104.

Turning to the outer circumferential edge 104, the outer circumferential edge 104 may have a predetermined width W2. By having a predetermined width W2, a greater or smaller area may be provided on which the groove 112 may be applied. More specifically, with a greater width W2, the groove 112 may have a greater amount of space on which it may be applied or extended. On the other hand, with a smaller width W2, the groove 112 may have a smaller amount of space on which it may be applied, yet the total weight of the main rotor shaft 34 may be reduced. As an example, the width W2 may have a width ranging from 0.05 to about 5 meters, such as about 0.25 meter to about 4 meters, such as about 0.5 meters to about 3 meters.

Turning to the outer radial area 106 of the main rotor shaft 34, it should be understood that the groove 112 may still be configured to or capable of reducing contact pressure at the hub-shaft joint connection for a variety of sizes of outer radial areas for main rotor shafts. For example, the outer radial area 106 may have a predetermined radius R1 ranging from about 0.5 meters to about 10 meters, such as about 1 meter to about 5 meters, such as about 2 meters to about 4 meters.

Turning to the inner radial area 108 of the main rotor shaft 34, like the outer radial area 106, it should be understood that the groove 112 may still be configured to or capable of reducing contact pressure at the hub-shaft joint connection for a variety of sizes of inner radial areas for main rotor shafts. For example, the inner radial area 108 may have a predetermined radius R2 ranging from about 0.1 meters to about 8 meters, such as about 0.5 meters to about 6 meters, such as about 2 meters to about 4 meters.

Figure 5:
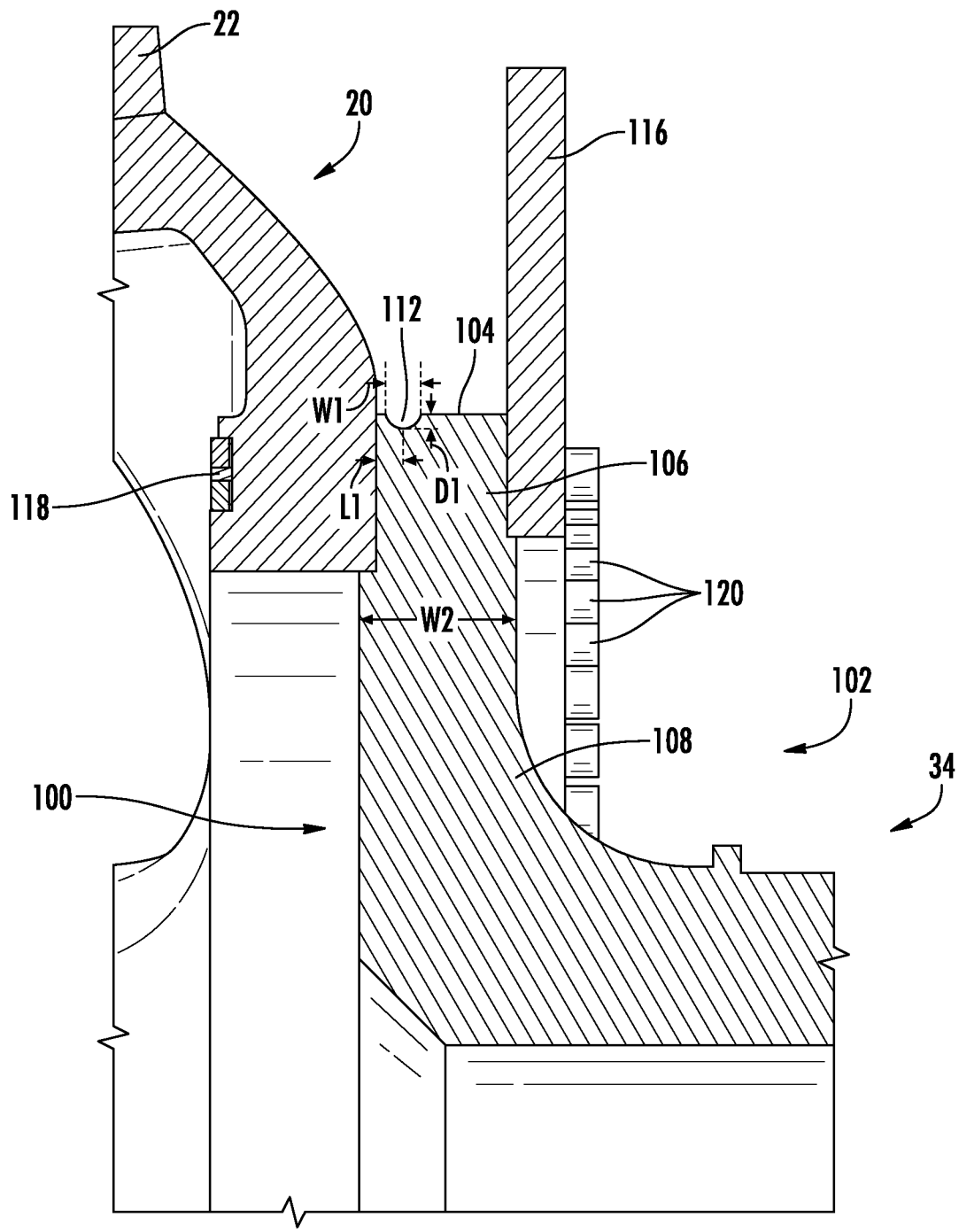
FIG. 5 illustrates a side, cutaway view of an embodiment of the main rotor shaft of FIG. 3 attached to the windmill turbine hub of FIGS. 1-2 according to the present disclosure.
Figure 6:
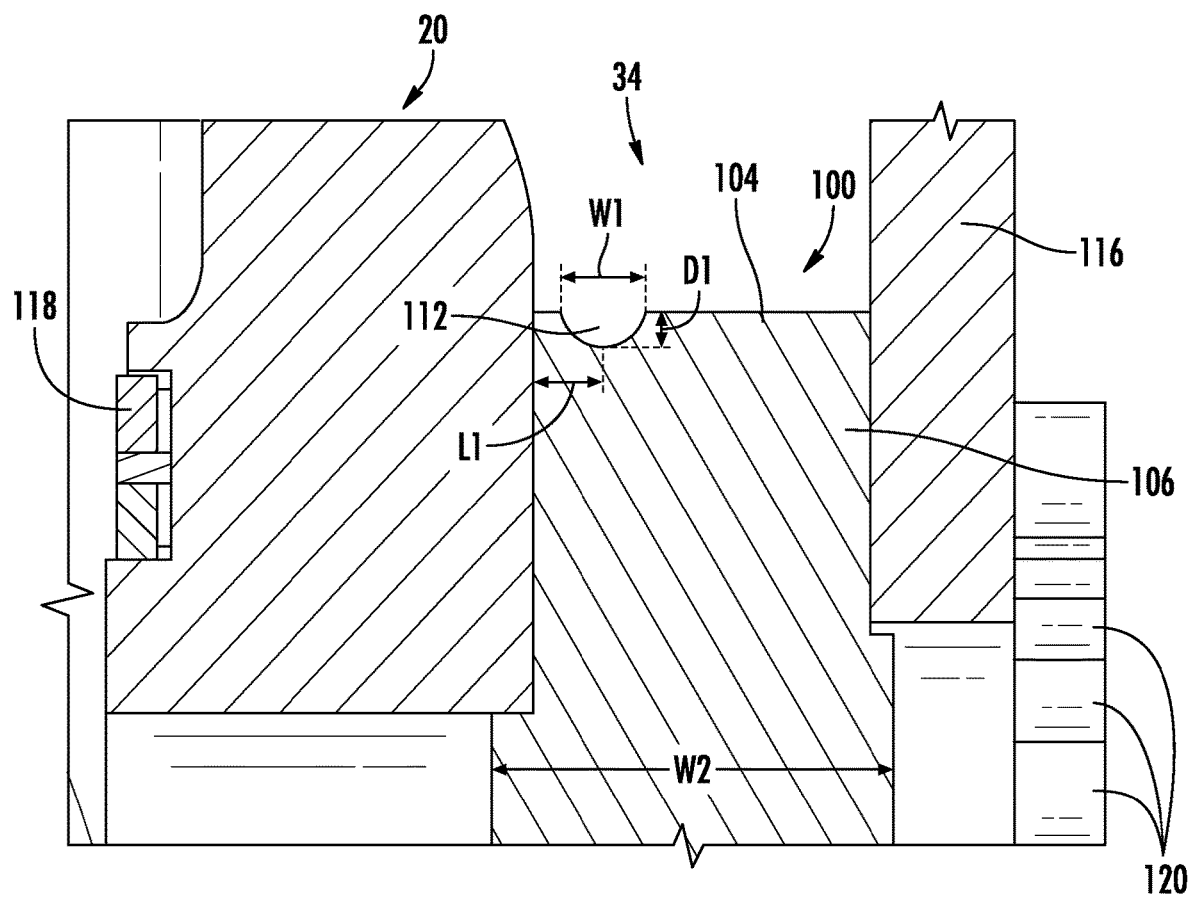
FIG. 6 illustrates a magnified, cutaway view an embodiment of the main rotor shaft of FIG. 3 attached to the windmill turbine hub of FIGS. 1-2 according to the present disclosure.

Referring now to FIGS. 5-6, various cutaway views of the main rotor shaft 34 connected to the hub 20 are provided. As shown, main rotor shaft 34 is connected to the hub 20 through the holes 110 (see FIGS. 3-4) of the main rotor shaft 34 via hub connections 118. In exemplary embodiments, the hub connections 118 may be nuts and bolts connections, however, the hub connections 118 may take any form sufficient to connect the main rotor shaft 34 to the hub 20, such as pins, screws, studs, or anchors.

In addition, the main rotor shaft 34 may also have a rotor lock disc ("RLD") 116. The RLD 116 is attached to the main rotor shaft 34 with RLD connections 120 for locking of the main rotor shaft 34 during maintenance so that the main rotor shaft 34 may not move freely and cause difficulties to a serviceman performing maintenance on the main rotor shaft 34 or other parts of the wind turbine 10. Like the hub connections 118, in exemplary embodiments, the RLD connections 120 may be nuts and bolts connections, however, the RLD connections 120 may take any form sufficient to lock the main rotor shaft 34 during maintenance, such as pins, screws, studs or anchors.

Further, the groove 112 may be placed at a predetermined length L1 from the hub 20. By placing the groove 112 at a shorter predetermined length L1 the hub 20, the groove 112 may be configured to or capable of further reducing contact pressure at the hub-shaft joint connection, when compared to placing the groove 112 further from the hub 20. For example, the groove 112 may be placed within about 0.1 centimeters to about 100 centimeters, such as about 10 centimeters to about 50 centimeters, such as about 25 centimeters to about 40 centimeters.

Figure 7:
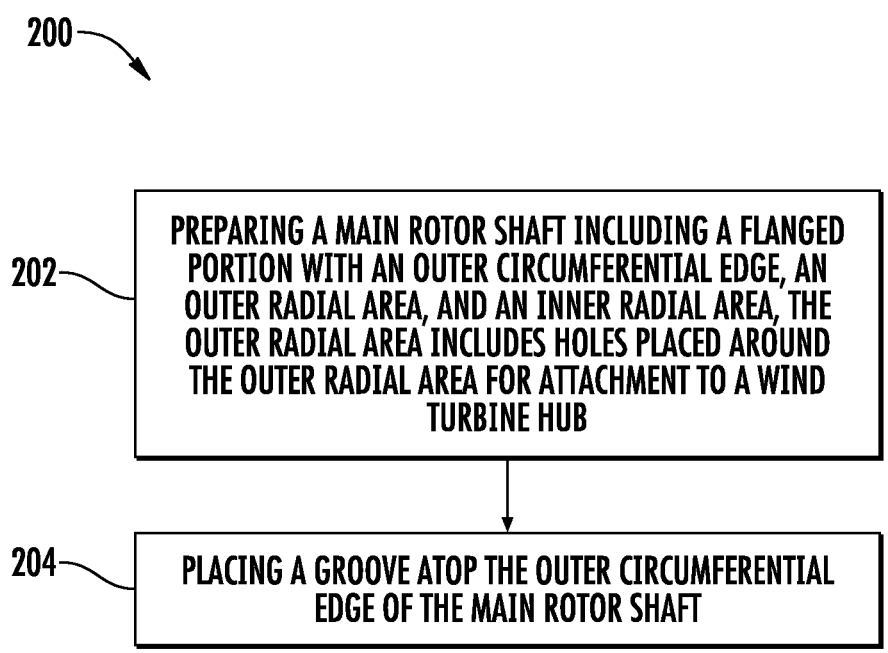
FIG. 7 illustrates a flow diagram one embodiment of a method of manufacturing a main rotor shaft according to the present disclosure

Referring now to FIG. 7, a flow diagram of one embodiment of a method 200 of manufacturing a main rotor shaft according to the present disclosure is provided. It should be understood that the method 200 may be implemented using, for instance, the main rotor shaft 34 of the present disclosure discussed above with reference to FIGS. 1-6. FIG. 7 depicts steps performed in a particular order for purposes of illustration and discussion. Those of ordinary skill in the art, using the disclosures provided herein, will understand that various steps of the method 200, or any of the methods disclosed herein, may be adapted, modified, rearranged, performed simultaneously, or modified in various ways without deviating from the scope of the present disclosure.

As shown at (202), the method 200 includes providing a main rotor shaft. The main rotor shaft includes a flanged portion with an outer circumferential edge, an outer radial area, and an inner radial area, the outer radial area includes holes placed around the outer radial area for attachment to a wind turbine hub, and a rod portion formed with the inner circumferential area configured for connection to a gearbox of a wind turbine. As shown at (204), the method 200 includes placing a groove atop the outer circumferential edge of the main rotor shaft.

In addition, one advantage of the groove is that it may be placed atop the flanged portion via a variety of techniques. For example, the method 200 may also include placing the groove atop the flanged portion via at least one of machining or cast forging in exemplary embodiments. However, it should be understood that other techniques capable of placing a groove atop the flanged portion may be employed.

Further, another advantage of the groove is that it may be placed at any time during the manufacturing process of the main rotor shaft. For example, the method 200 may also include placing the groove after the shaft is prepared. Alternatively, the method may also include placing the groove contemporaneously as the shaft is being prepared.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A main rotor shaft of a wind turbine configured to reducing contact pressure at a hub joint connection, the main rotor shaft comprising:
    a flanged portion including an outer circumferential edge, an outer radial area, and an inner radial area, wherein the outer radial area includes holes placed around the outer radial area for attachment to a wind turbine hub, wherein the outer circumferential edge includes a groove placed atop the outer circumferential edge, wherein when the flanged portion is connected to the wind turbine hub, the groove is placed at a length from the hub less than about 100 centimeters; and
    a rod portion formed with the inner radial area and configured for connection to a gearbox of the wind turbine.

2. The main rotor shaft of claim 1, wherein the groove of the outer circumferential edge defines a curved shape.

3. The main rotor shaft of claim 2, wherein the curved shape comprises at least one of a half-circle, a half-ellipse, a half-oval, a half-oblong, or a trough shape.

4. The main rotor shaft of claim 1, wherein the groove of the outer circumferential edge has a depth ranging from about 0.10 centimeters to about 200 centimeters.

5. The main rotor shaft of claim 1, wherein the groove of the outer circumferential edge has a width ranging from about 0.10 centimeters to about 200 centimeters.

6. The main rotor shaft of claim 1, wherein the groove of the outer circumferential edge is placed around about 1% to about 100% of a circumference of the outer circumferential edge.

7. The main rotor shaft of claim 1, wherein the groove of the outer circumferential edge is continuously or discretely placed around the outer circumferential edge.

8. The main rotor shaft of claim 1, wherein the outer radial area has a radius ranging from about 0.2 meters to about 10 meters.

9. A method of manufacturing a main rotor shaft of a wind turbine configured to reducing contact pressure at a hub-joint connection, the method comprising:
    manufacturing a main rotor shaft, the main rotor shaft comprising:
        a flanged portion with an outer circumferential edge, an outer radial area, and an inner radial area, wherein the outer radial area includes holes placed around the outer radial area for attachment to a wind turbine hub, and
        a rod portion formed with the inner radial area and configured for connection to a gearbox of the wind turbine, and
    placing a groove atop the outer circumferential edge of the main rotor shaft, wherein when the flanged portion is connected to the wind turbine hub, the groove is placed at a length from the hub less than about 100 centimeters.

10. The method of claim 9, wherein the groove is placed via at least one of machining or cast forging.

11. The method of claim 9, wherein the groove is placed after the main rotor shaft is manufactured.

12. The method of claim 9, wherein the groove is placed contemporaneously as the main rotor shaft is being manufactured.

13. The method of claim 9, wherein the groove of the outer circumferential edge defines a curved shape.

14. The method of claim 13, wherein the curved shape comprises at least one of a half-circle, a half-ellipse, a half-oval, a half-oblong, or a trough shape.

15. The method of claim 9, wherein the groove atop the outer circumferential edge has a depth ranging from about 0.10 centimeters to about 200 centimeters.

16. The method of claim 9, wherein the groove atop the outer circumferential edge has a width ranging from about 0.10 centimeters to about 200 centimeters.

17. The method of claim 9, wherein the groove atop the outer circumferential edge is placed around about 1% to about 100% of a circumference of the outer circumferential edge.

18. The method of claim 9, wherein the groove of the outer circumferential edge is continuously or discretely placed around the outer circumferential edge.

19. The method of claim 9, wherein the outer radial area has a radius ranging from about 0.2 meters to about 10 meters.

20. A wind turbine including a main rotor shaft configured to reducing contact pressure at a hub joint connection, the wind turbine comprising:

a nacelle;
a hub; and
the main rotor shaft, wherein the main rotor shaft comprises:
    a flanged portion at a first end with an outer circumferential edge, an outer radial area, and an inner radial area, wherein the outer radial area includes holes placed around the outer radial area for attachment to the hub, wherein the outer circumferential edge includes a groove placed atop the outer circumferential edge, wherein when the flanged portion is connected to the wind turbine hub, the groove is placed at a length from the hub less than about 100 centimeters, and
    a rod portion formed with the inner radial area and configured for connection to a gearbox of the wind turbine.

\* \* \* \* \*